United States Patent
Sadowski

(10) Patent No.: US 11,436,486 B2
(45) Date of Patent: Sep. 6, 2022

(54) NEURAL NETWORK INTERNAL DATA FAST ACCESS MEMORY BUFFER

(71) Applicant: Advanced Micro Devices, Inc., Santa Clara, CA (US)

(72) Inventor: Greg Sadowski, Cambridge, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 575 days.

(21) Appl. No.: 16/544,242

(22) Filed: Aug. 19, 2019

(65) Prior Publication Data

US 2021/0056403 A1 Feb. 25, 2021

(51) Int. Cl.
| | |
|---|---|
| *G06F 9/30* | (2018.01) |
| *G06N 3/08* | (2006.01) |
| *G06N 3/04* | (2006.01) |
| *G06F 12/0802* | (2016.01) |
| *G06F 9/54* | (2006.01) |

(52) U.S. Cl.
CPC ............ *G06N 3/08* (2013.01); *G06F 9/30145* (2013.01); *G06F 9/544* (2013.01); *G06F 12/0802* (2013.01); *G06N 3/04* (2013.01)

(58) Field of Classification Search
CPC ........ G06N 3/08; G06N 3/04; G06F 9/30145; G06F 9/544; G06F 12/0802
See application file for complete search history.

(56) References Cited

U.S. PATENT DOCUMENTS

| | | | | |
|---|---|---|---|---|
| 5,826,249 | A * | 10/1998 | Skeirik ............... | G05B 13/027 706/15 |
| 10,002,313 | B2 * | 6/2018 | Vaca Castano ...... | G06N 3/0454 |
| 10,540,588 | B2 * | 1/2020 | Burger ................ | G06F 15/7803 |
| 10,878,188 | B2 * | 12/2020 | Zhang .................. | G06F 40/284 |
| 10,937,173 | B2 * | 3/2021 | Ali Akbarian ......... | G06N 5/046 |
| 11,106,975 | B2 * | 8/2021 | Lei ......................... | G06N 3/084 |
| 2018/0121799 | A1 * | 5/2018 | Hashimoto .......... | G06N 3/0454 |
| 2021/0042606 | A1 * | 2/2021 | Bai ....................... | G06N 3/0445 |

\* cited by examiner

*Primary Examiner* — Cheng Yuan Tseng

(74) *Attorney, Agent, or Firm* — Kowert Hood Munyon Rankin and Goetzel PC; Rory D. Rankin

(57) ABSTRACT

Systems, apparatuses, and methods for optimizing neural network training with a first-in, last-out (FILO) buffer are disclosed. A processor executes a training run of a neural network implementation by performing multiple passes and adjusting weights of the neural network layers on each pass. Each training phase includes a forward pass and a backward pass. During the forward pass, each layer, in order from first layer to last layer, stores its weights in the FILO buffer. An error is calculated for the neural network at the end of the forward pass. Then, during the backward pass, each layer, in order from last layer to first layer, retrieves the corresponding weights from the FILO buffer. Gradients are calculated based on the error so as to update the weights of the layer for the next pass through the neural network.

20 Claims, 10 Drawing Sheets

NEURAL NETWORK INTERNAL DATA FAST ACCESS MEMORY BUFFER

BACKGROUND

Description of the Related Art

An emerging technology field is machine learning, with a neural network being one type of a machine learning model. Neural networks have demonstrated excellent performance at tasks such as hand-written digit classification and face detection. Additionally, neural networks have also shown promise for performing well in other, more challenging, visual classification tasks. Other applications for neural networks include speech recognition, language modeling, sentiment analysis, text prediction, and others. However, neural networks often use significant amounts of processing and memory resources. Implementing neural networks on GPUs or other parallel processing units (e.g., digital signal processors (DSPs), field programmable gate arrays (FP-GAs), application specific integrated circuits (ASICs)) involves loading and processing large amounts of data.

A neural network can have any number and type of layers, with the number and type varying according to the type of neural network. For example, a convolutional neural network typically includes many layers such as convolution layers, pooling layers, normalization layers, and so on. Each layer can have any number of neurons which process the input data to the layer. When training a neural network, training input data is processed by the neural network, and parameters of the neural network are adjusted based on the difference between the actual output produced by the neural network and the correct (i.e., expected) output associated with the training input data. A set of updates to the individual parameters (i.e., weights) of the neural network can be calculated based on the difference (i.e., error) using a preferred training algorithm (e.g., stochastic gradient descent). In stochastic gradient descent, a modification to each parameter of the neural network is based on the error in the output produced by the neural network. A gradient is computed that corresponds to the direction in which each individual parameter of the neural network is to be adjusted so as to improve the accuracy of the output. These incremental adjustments to the parameters, made after each training pass, improve the accuracy of the neural network. The updates to the parameters are performed iteratively until the output error falls below some threshold, indicating that the neural network has been trained.

One common type of training algorithm for neural networks is the backpropagation algorithm which follows a gradient descent approach. The backpropagation algorithm adjusts the weight of neurons by calculating the gradient of the loss function. The backpropagation algorithm requires a significant amount of data to be put aside during the forward pass of neural network evaluation and then the data is needed during the backward pass when weights are being adjusted (the purpose of training). Typically, the regular cache/memory hierarchy is used for data movement and storage which is not efficient since the regular memory/cache hierarchy architecture is designed for a different type of data re-use.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for optimizing neural network training with a first-in, last-out (FILO) buffer are disclosed herein. It is noted a FILO buffer is often referred to as a last-in-first-out buffer (LIFO) or a "stack", and write and read operations from the stack are referred to as pushes and pops, respectively. A system includes at least a compute engine, a FILO buffer, and a memory subsystem. During a forward phase of neural network training, a layer's weights and other parameters are written into the FILO buffer in a layer-after-layer (from input layer to output layer) fashion. During the backward phase, the data is retrieved from the NN-FILO device in output-layer to input-layer direction. This results in an efficient scheme of data storage when performing gradient calculations as the data is packed, compressed, and moved out of the integrated circuit (IC) and then back into the IC as the data is needed. By using this approach, the amount of address decoding and arbitration involved is reduced, which lowers the energy cost.

Figure 1:
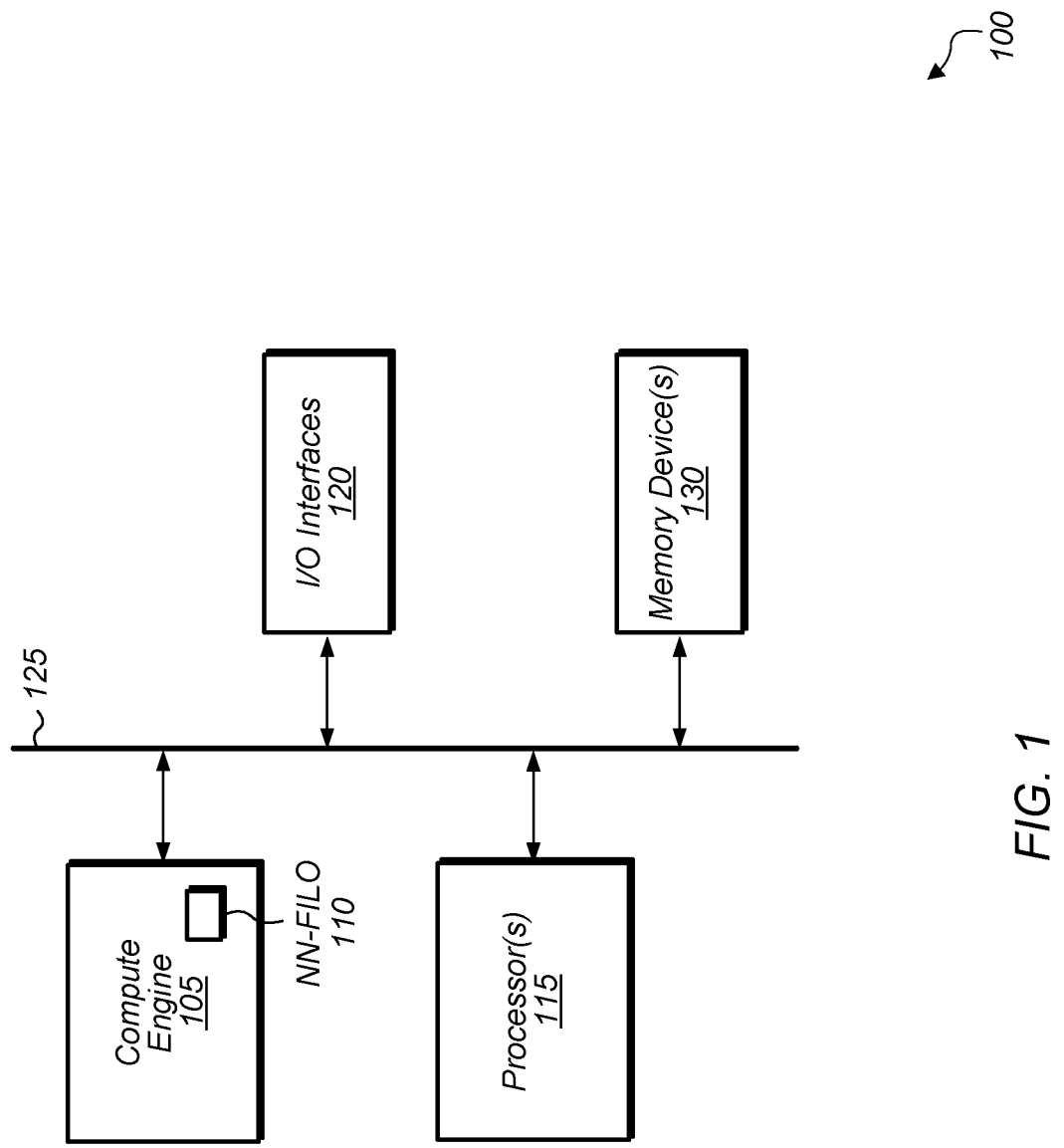
FIG. 1 is a block diagram of one implementation of a computing system.

Referring now to FIG. 1, a block diagram of one implementation of a computing system 100 is shown. In one implementation, computing system 100 includes at least compute engine 105, processor(s) 115, input/output (I/O) interfaces 120, bus 125, and memory device(s) 130. In other implementations, computing system 100 includes other components and/or computing system 100 is arranged differently. It is noted that compute engine 105 can be programmed to implement a neural network, an inference engine, or other types of applications and/or models. It is also noted that processor(s) 115 can also be referred to herein as "processing units".

In various implementations, compute engine 105 includes circuitry (e.g., a plurality of processing elements) for implementing any of various machine learning algorithms or machine learning models. In one implementation, compute engine 105 implements one or more layers of a recurrent neural network. For example, in this implementation, compute engine 105 implements one or more matrix multiplication layers and one or more long short-term memory (LSTM) layers. In another implementation, compute engine 105 implements one or more layers of a convolutional neural network. In other implementations, compute engine 105 executes other types of machine learning models. In one implementation, compute engine 105 includes neural network first-in, last-out (NN-FILO) buffer 110 for storing data used by the layers of a neural network during training of the neural network.

In one implementation, compute engine 105 implements a neural network being trained. After the neural network is trained, compute engine 105 can operate the trained neural network as an inference engine. For example, in one implementation, compute engine 105 analyzes a video frame to generate one or more label probabilities for the video frame. For example, potential use cases include at least eye tracking, object recognition, point cloud estimation, ray tracing, light field modeling, depth tracking, and others. For eye tracking use cases, probabilities generated by compute engine 105 are based on learned patterns, dwell, transition angles, blink, etc. In other implementations, compute engine 105 is customized for other types of use cases. For example, in these implementations, compute engine 105 is customized for speech recognition, language modeling, sentiment analysis, text prediction, and/or other applications. In further implementations, compute engine 105 executes other types of software models or algorithms besides machine learning models.

Processors(s) 115 are representative of any number and type of processing units (e.g., central processing unit (CPU), graphics processing unit (GPU), digital signal processor (DSP), field programmable gate array (FPGA), application specific integrated circuit (ASIC)). Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by compute engine 105 and processor(s) 115. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In one implementation, the functionality of NN-FILO 110 is independent from the existing cache hierarchy of system 100. In another implementation, the functionality of NN-FILO 110 is merged with the existing cache hierarchy. In one implementation, by inclusion of NN-FILO 110 within compute engine 105, an instruction is added to the programming language to direct the data to and from NN-FILO 110. In this implementation, the management of data in the software application is controlled by the programmer and/or compiler.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
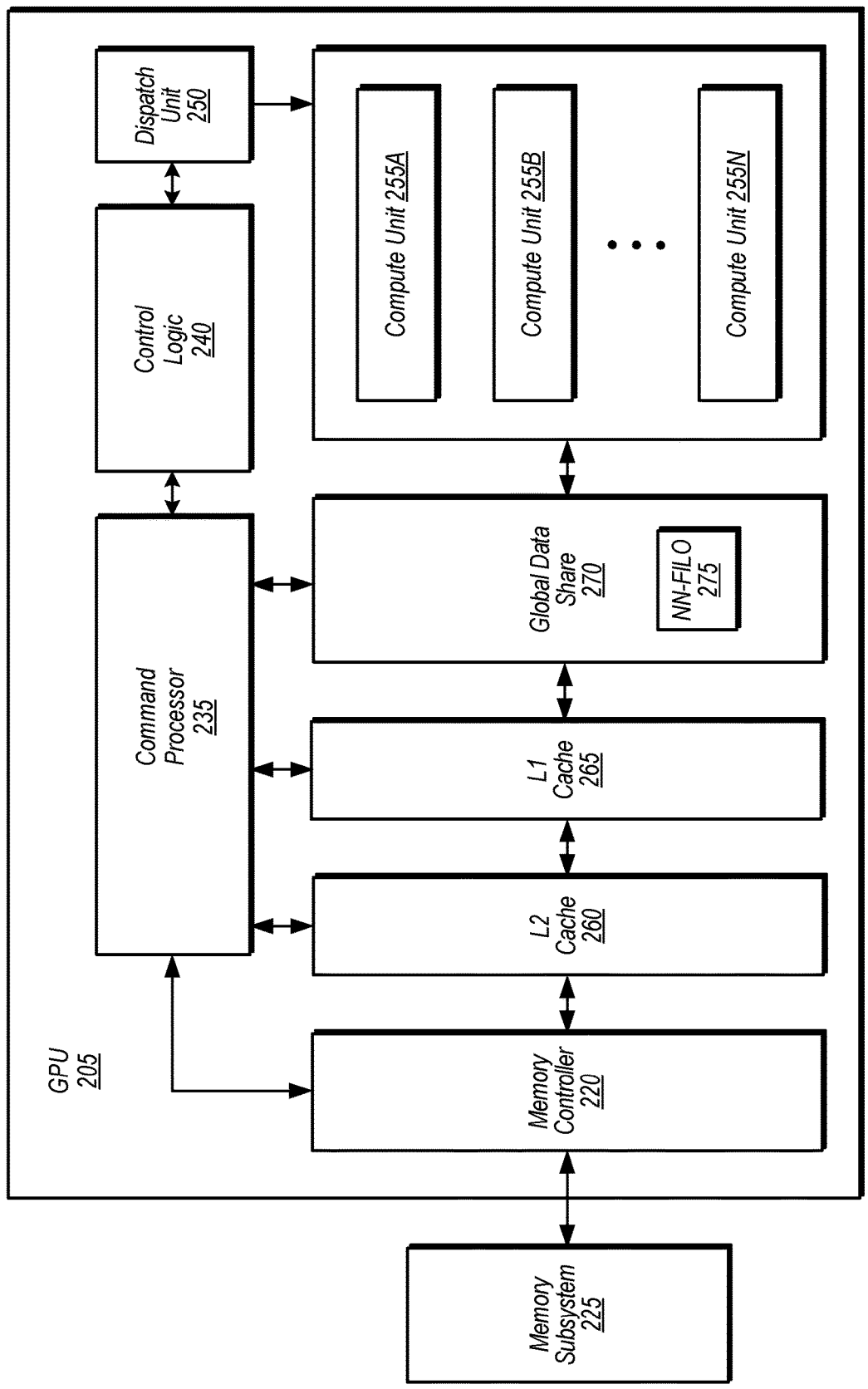
FIG. 2 is a block diagram of another implementation of a computing system.

Turning now to FIG. 2, a block diagram of another implementation of a computing system 200 is shown. In one implementation, system 200 includes GPU 205 and memory subsystem 225. System 200 also includes other components which are not shown to avoid obscuring the figure. In one implementation, GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in compute engine 105 (of FIG. 1).

In various implementations, computing system 200 executes any of various types of software applications. In one implementation, computing system 200 trains a neural network using a machine learning framework (e.g., TensorFlow®, CaffeNet). In one implementation, as part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, computing system 200 implements a training run of one or more layers neural network on compute units 255A-N. During each training run, a set of data is generated by each layer and stored in NN-FILO 275. It should be understood that while NN-FILO 275 is shown as being located in global data share 270, this is indicative of one particular implementation. In other implementations, NN-FILO 275 can be located in other suitable locations.

Figure 3:
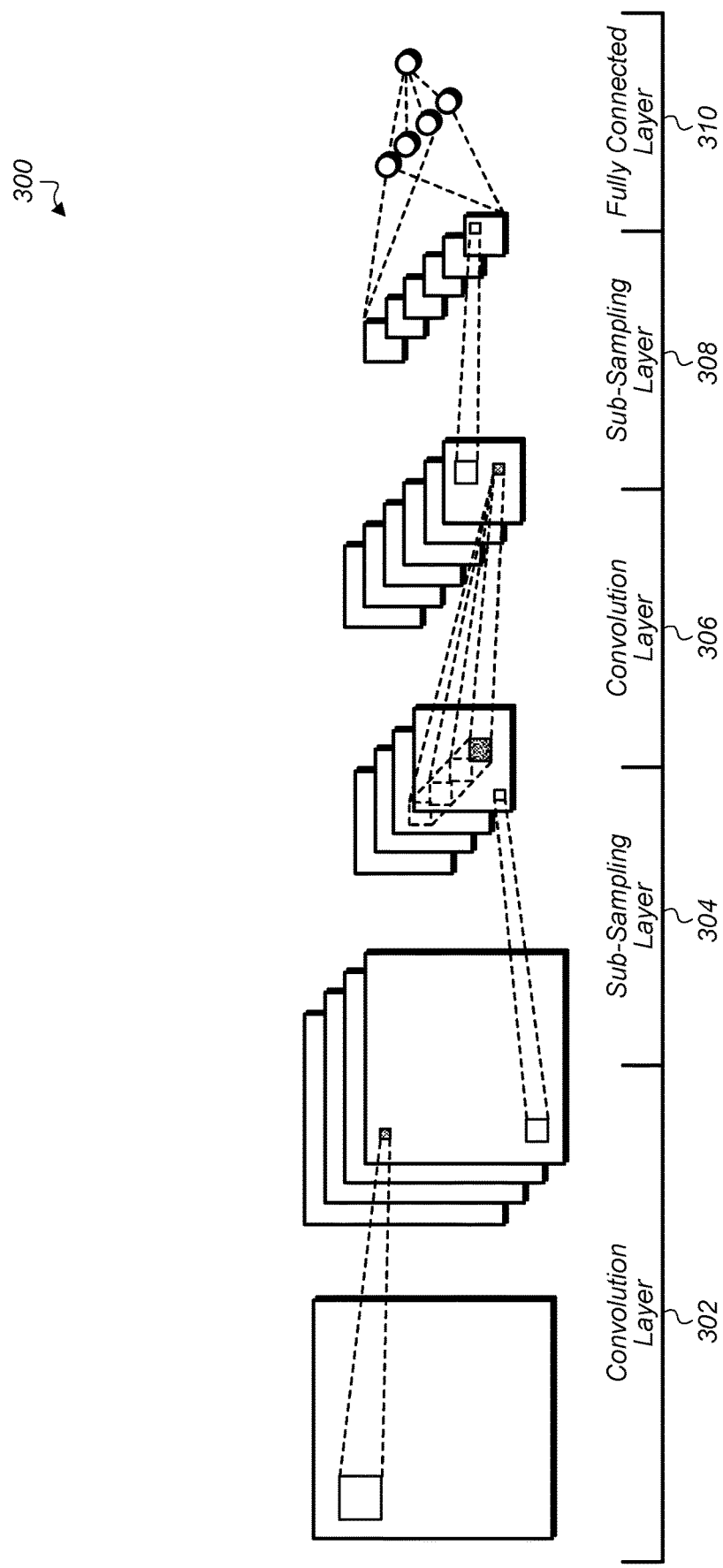
FIG. 3 is a block diagram of one implementation of a neural network.

Turning now to FIG. 3, a block diagram of one implementation of a neural network 300 is shown. Neural network 300 includes convolution layer 302, sub-sampling layer 304, convolution layer 306, sub-sampling layer 308, and fully connected layer 310. In other embodiments, neural network 300 can include other numbers and arrangements of layers. In general, during training, each layer of neural network 300 generates an output from a received input in accordance with the current values of a set of parameters corresponding to the layer. When training neural network 300 on a computing system (e.g., system 100 of FIG. 1, system 200 of FIG. 2), the performance of the system can be improved if the data generated by the layers during the forward passes is intelligently stored by taking into account the timing of the data reuse by the same layers during the backward passes. Accordingly, in one implementation, the data generated by each layer is stored in a FILO buffer (e.g., NN-FILO 275 of FIG. 2) during the forward pass as layers are processed first to last. During the backward pass, the data is retrieved from the FILO buffer as the layers are processed from last to first.

Generally speaking, when the neural network 300 is trained on a computer system, the computer system's memory subsystem is used in an efficient manner depending on the type of data generated and depending on which layer generated the data. The memory subsystem often includes multiple different devices that vary in terms of size and latency. Each device within the memory subsystem is used according to its characteristics to ensure that neural network 300 is trained in a manner that reduces power consumption as well as reducing the latency of memory accesses. For example, in one implementation, for the initial layers of the neural network 300, the data generated and/or used by these layers during the forward pass is stored in a remote (i.e., relatively longer access latency) memory device of the memory subsystem since the data will not be needed until near the end of the backward pass. This data is brought back closer to the compute engine as training progresses through the backward pass. Also, the data generated and/or used by the last few layers of the neural network 300 is stored in a closer (i.e., relatively shorter access latency) memory device during the forward pass since this data will be reused relatively quickly when the backward pass is initiated.

Figure 4:
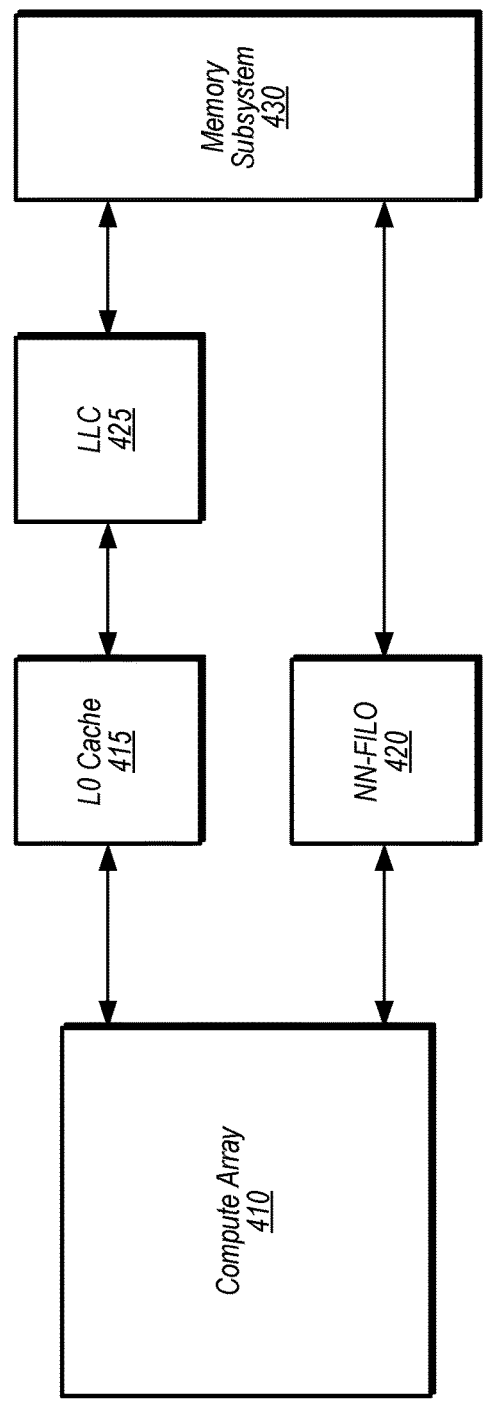
FIG. 4 is a block diagram of one implementation of a system for training a neural network.

Turning now to FIG. 4, a block diagram of one implementation of a system 400 for training a neural network is shown. In one implementation, system 400 includes at least compute array 410, level-zero (L0) cache 415, neural-network first-in, last-out (NN-FILO) buffer 420, last-level cache (LLC) 425, and memory subsystem 430. It is noted that system 400 can also include other components which are not shown to avoid obscuring the figure. In one implementation, compute array 410, level-zero (L0) cache 415, neural-network first-in, last-out buffer 420, last-level cache (LLC) 425 are on a first integrated circuit (IC) and memory subsystem 430 is on a second IC. In this implementation, it is more efficient to keep as much data on the first IC as possible to reduce the power consumption and latency involved in moving data between the first and second ICs.

During the forward phase of neural network training, weights, activation function parameters, and other parameters are written into NN-FILO 420 in a layer-after-layer (from input layer to output layer) fashion. For example, in one implementation, for a convolution layer, the weights include a set of filter weights which are used to implement a convolution filter operation. Then, during the backward phase, the data is read from NN-FILO 420 in output-layer to input-layer direction. For example, in one implementation, the filter weights are read back from NN-FILO 420 and adjusted in proportion to the gradient of the error. The approach illustrated in FIG. 4 is an efficient technique of data storage for performing gradient calculations as the data can be packed and compressed and moved out of compute array 410 and then back into compute array 410 at the time the data is needed. Using this approach, there is minimal address decoding and minimal arbitration involved, which helps to lower the energy cost associated with data storage. In various implementations, NN-FILO 420 has entries with a fixed size and a pointer to the head and/or tail of NN-FILO 420 are maintained. When pushing data onto NN-FILO 420, the data is stored at the location referenced by the head pointer and then the head pointer is incremented by the appropriate amount. For a pop operation, data is read from the location referenced by the tail pointer and then the tail point is decremented by the appropriate amount.

In one implementation, NN-FILO 420 is implemented as a linear array that follows a first-in, last-out access paradigm. It is noted that depending on the implementation, NN-FILO 420 can be an independent device, or NN-FILO 420 can be combined with any cache level (e.g., L0, level-one (L1), LLC). In one implementation, the caches are used for storing data associated with matrix multiplications and other operations that require a lot of data re-use. In one implementation, NN-FILO 420 is used exclusively for back propagation calculations. It is noted that if system 400 is used only in inference mode, then NN-FILO 420 is able to use its memory to augment the cache hierarchy for better performance. To enable this flexibility, in one implementation, NN-FILO 420 is merged with the existing caches (e.g., L0 Cache 415, LLC 425) of system 400.

Figure 5:
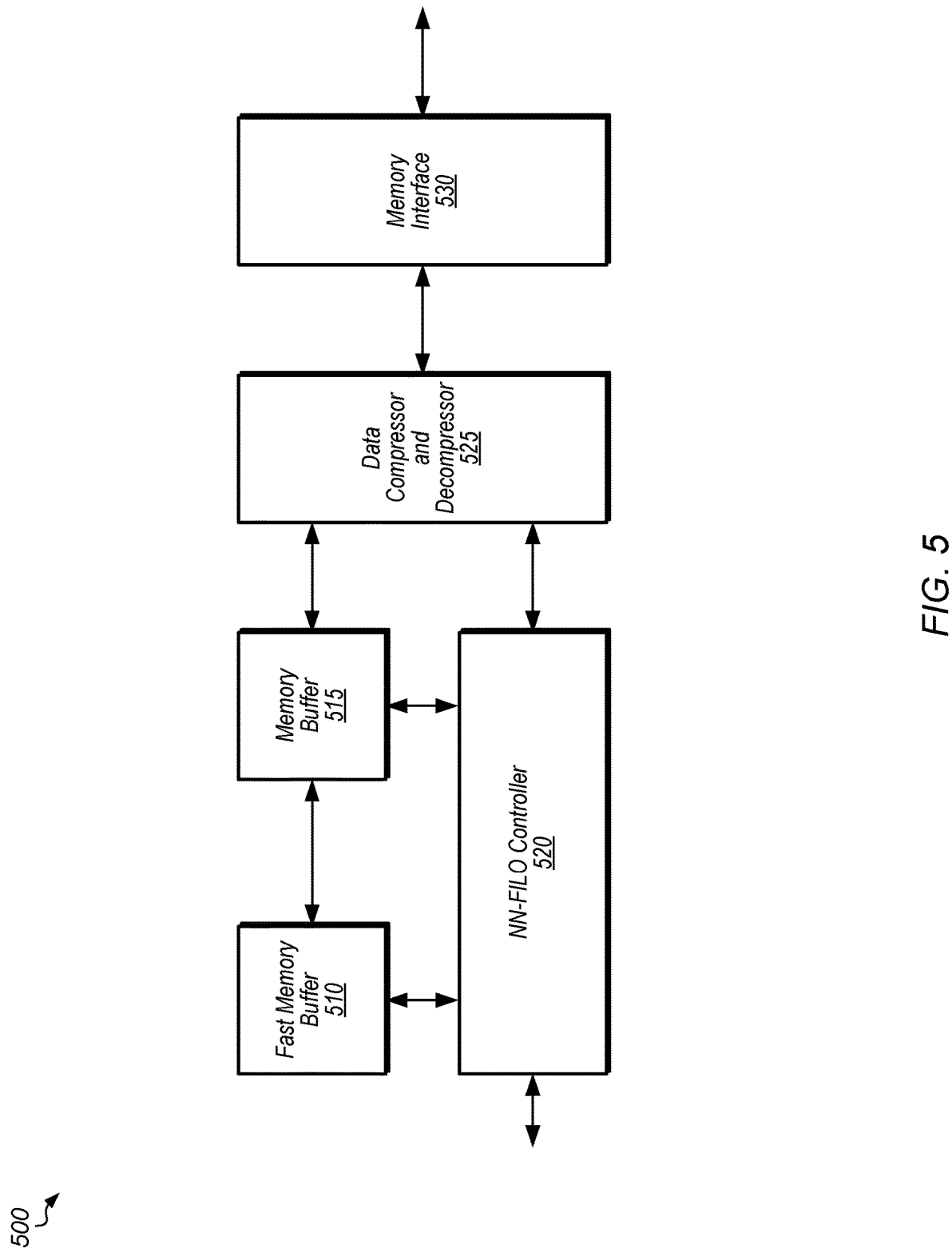
FIG. 5 is a block diagram of one implementation of a portion of a memory subsystem for training a neural network.

Referring now to FIG. 5, a block diagram of one implementation of a portion of a memory subsystem 500 for training a neural network is shown. In one implementation, memory subsystem 500 includes at least fast memory buffer 510, memory buffer 515, NN-FILO controller 520, data compressor and decompressor unit 525, and memory interface 530. In one implementation, fast memory buffer 510 includes a plurality of storage elements arranged using a first-in, last-out (FILO) structure. It is noted that a FILO structure is sometimes referred to as a last-in, first-out (LIFO) structure. In one implementation, memory buffer 515 is a relatively larger and slower device than fast memory buffer 510. It is noted that memory subsystem 500 can also include other components which are not shown to avoid obscuring the figure.

In one implementation, during the forward phase of neural network training, the fast memory buffer 510 stores data generated and/or used by a given neural network layer. If the amount of data exceeds a first threshold (e.g., full capacity of fast memory buffer 510), the data is moved to memory buffer 515. Data in memory buffer 515 is compressed by unit 525 and written to a remote type of memory (e.g., DRAM) over memory interface 530. In one implementation, unit 525 removes the redundancy from the data streams and also reduces the toggle rates. In one implementation, unit 525 matches the compression algorithms to the nature of data patterns in the particular neural network. In one implementation, during the backward phase, the data from fast memory buffer 510 is read by a layer for gradient calculation processing. If the data level of fast memory buffer 510 drops below a second threshold (e.g., almost empty level), the data is read from memory buffer 515 to refill fast memory buffer 510.

In one implementation, during the forward phase, memory buffer 515 holds the data which will be compressed and written to remote memory. During the backward phase, memory buffer 515 holds the data which has been retrieved from remote memory (after decompression by unit 525), and memory buffer 515 provides this data to fast memory buffer 510. NN-FILO controller 520 coordinates data movement between the compute engine (not shown), fast memory buffer 510, memory buffer 515, and the memory interface 530. NN-FILO controller 520 is implemented using any suitable combination of hardware and/or software.

Figure 6:
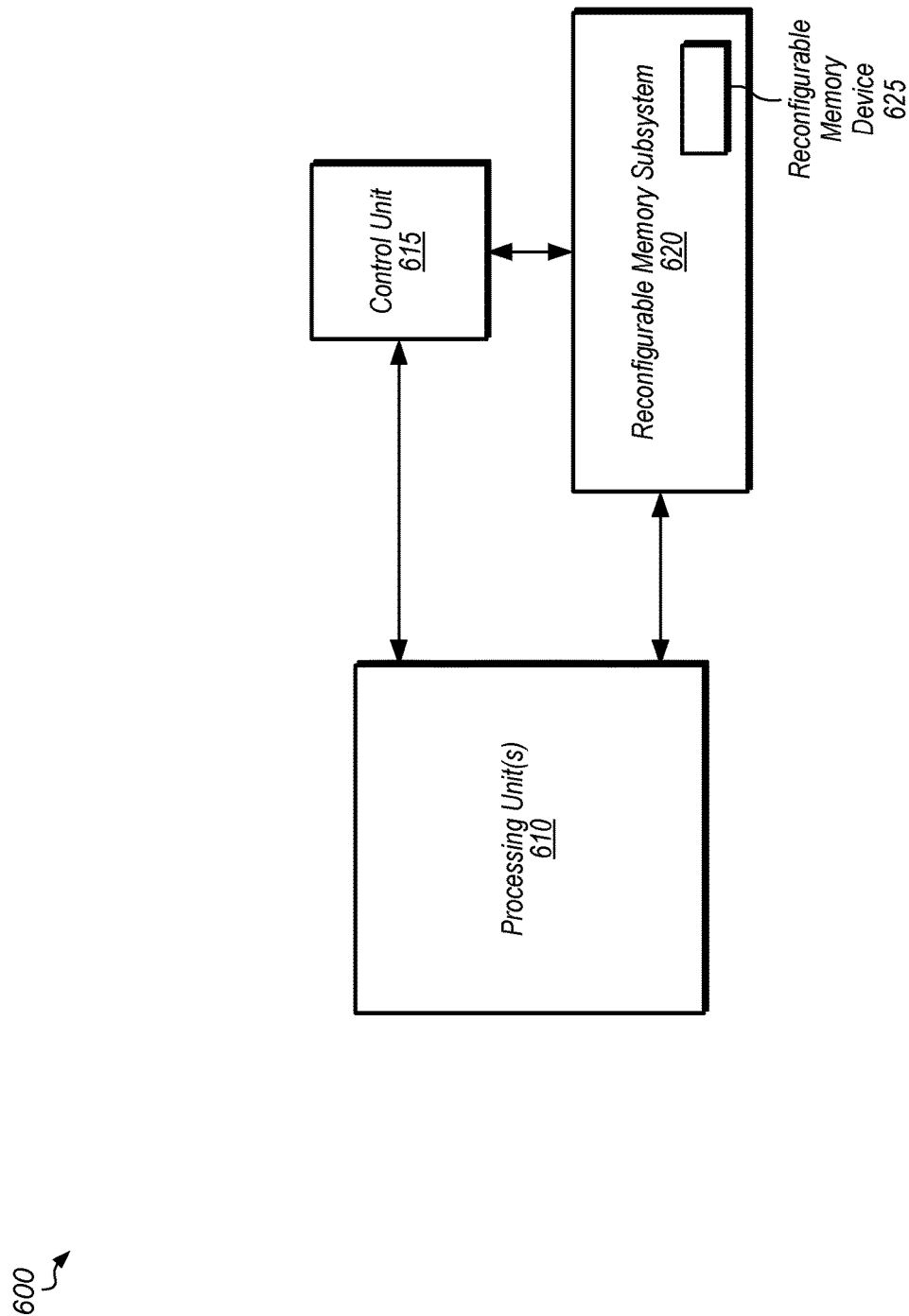
FIG. 6 is a block diagram of one implementation of a computing system.

Turning now to FIG. 6, a block diagram of one implementation of a computing system 600 is shown. In one implementation, computing system 600 includes at least processing unit(s) 610, control unit 615, and reconfigurable memory subsystem 620. Processing unit(s) 610 are representative of any number and type (e.g., general purpose, programmable, hard-wired, parallel execution architecture) of processing units. In one implementation, reconfigurable memory subsystem 620 includes a plurality of memory and/or cache devices, with reconfigurable memory device 625 one of the memory devices therein. In other implementations, computing system 600 includes other components, omits one or more of the illustrated components, and/or computing system 600 is arranged differently.

In one implementation, reconfigurable memory subsystem 620 is reprogrammed by control unit 615 to fulfill the requirements of the application being executing on processing unit(s) 610. For example, in one implementation, processing unit(s) 610 are executing an application which is part of a framework for training a neural network. During training of the neural network, control unit 615 programs reconfigurable memory device 625 to be a FILO buffer for storing weights, activation function parameters, and/or other data in a forward pass. In one implementation, control unit 615 programs the size of the FILO buffer to be large enough to store the entirety of the weights, activation function parameters, and/or other data for any layer of the plurality of layers of the neural network. At the end of the forward pass, an error is calculated for the neural network. During the backward pass, the weights and other parameters are retrieved from the FILO buffer and the weights and other parameters are adjusted in proportion to the gradient of the error. After the neural network is trained, the neural network can be used as an inference engine. When the neural network is used as an inference engine, control unit 615 reprograms reconfigurable memory device 625 to fit into the normal cache/memory hierarchy of reconfigurable memory subsystem 620. Additionally, for other types of applications executed by computing system 600, reconfigurable memory device 625 is programmed to be used in the traditional manner as part of the cache and/or memory device structure. This ensures that reconfigurable memory device 625 will be available for those applications which do not involve training of neural networks.

Figure 7:
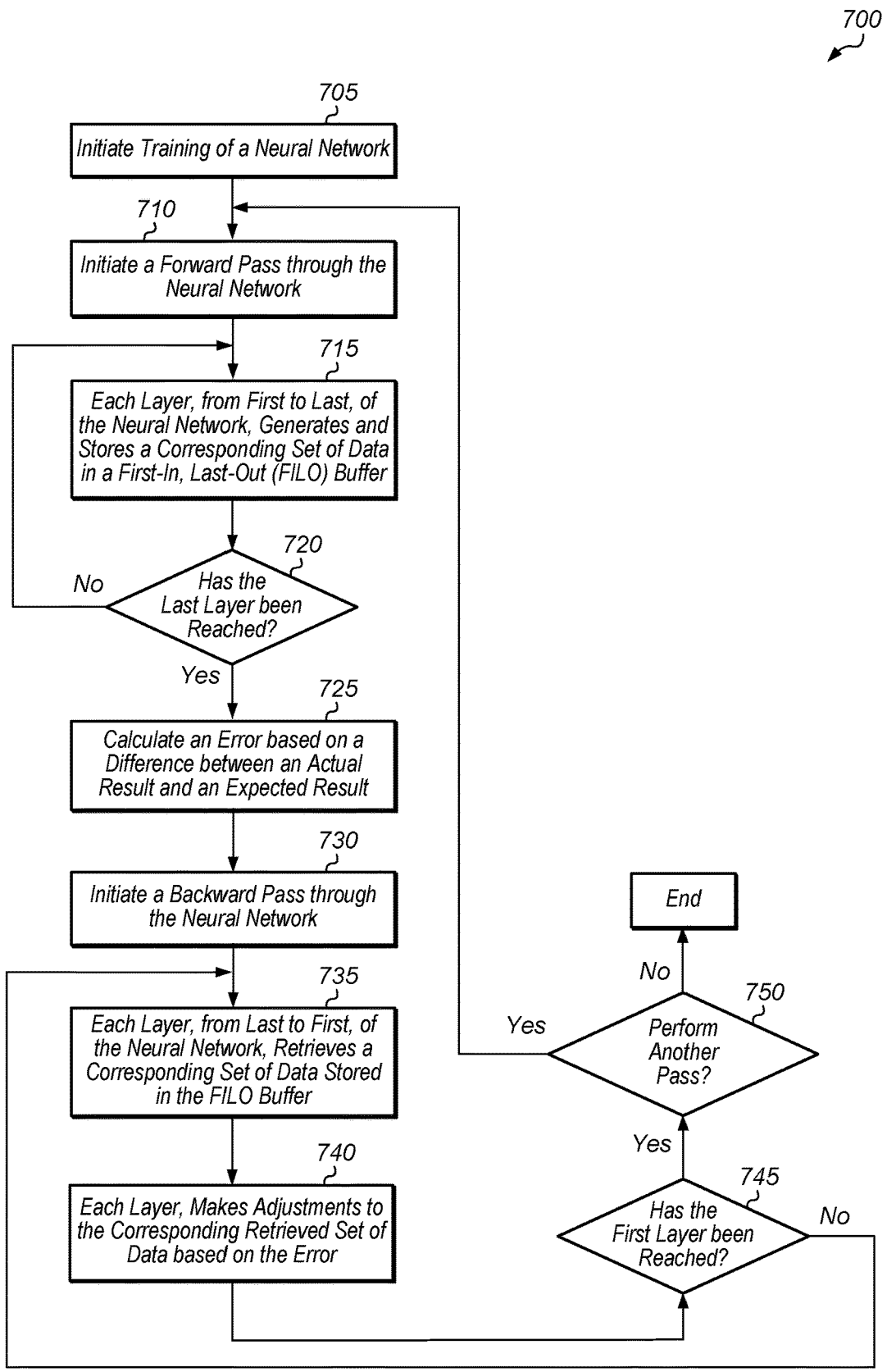
FIG. 7 is a generalized flow diagram illustrating one implementation of a method for optimizing neural network training with a first-in, last-out (FILO) buffer.
Figure 8:
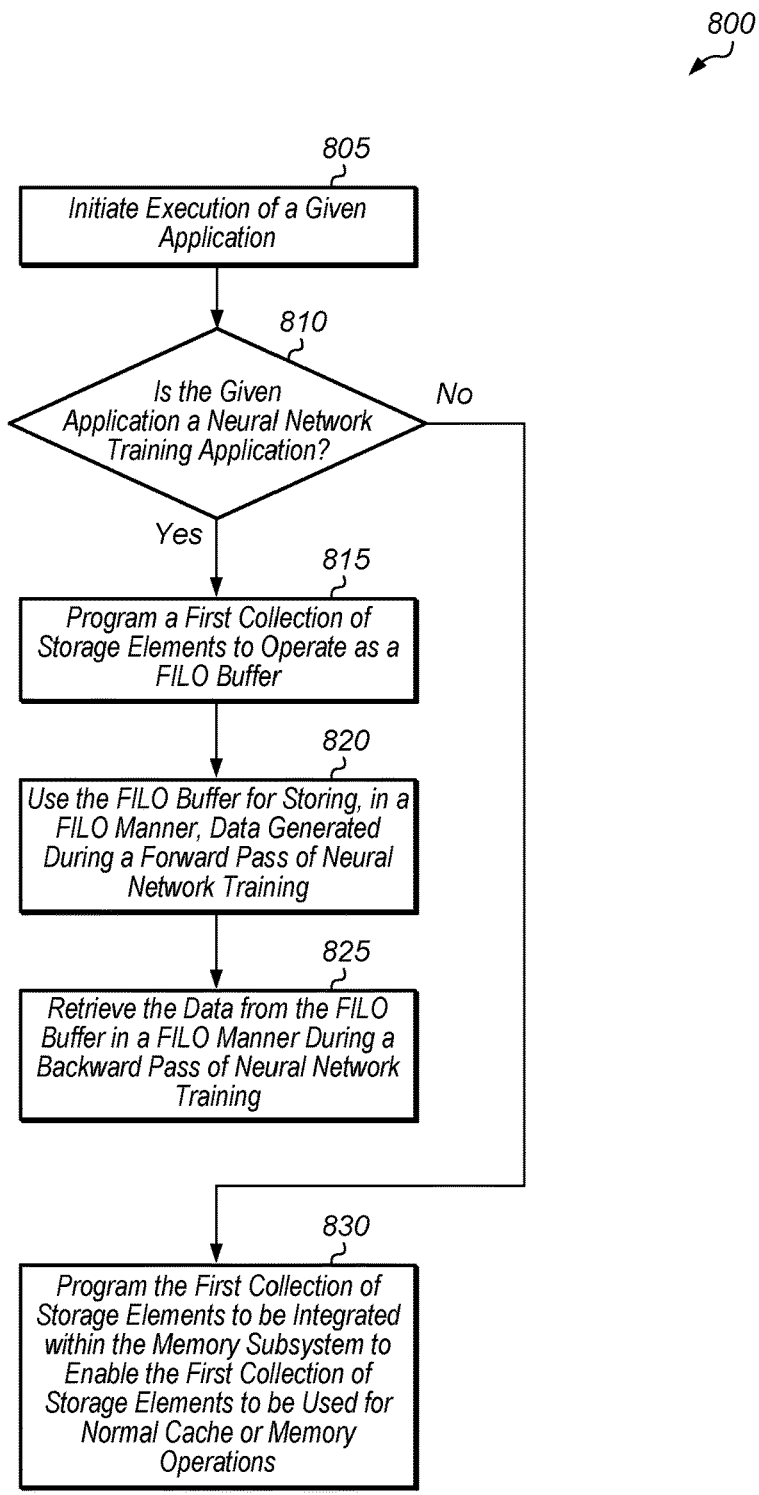
FIG. 8 is a generalized flow diagram illustrating one implementation of a method for using a reconfigurable memory subsystem.
Figure 9:
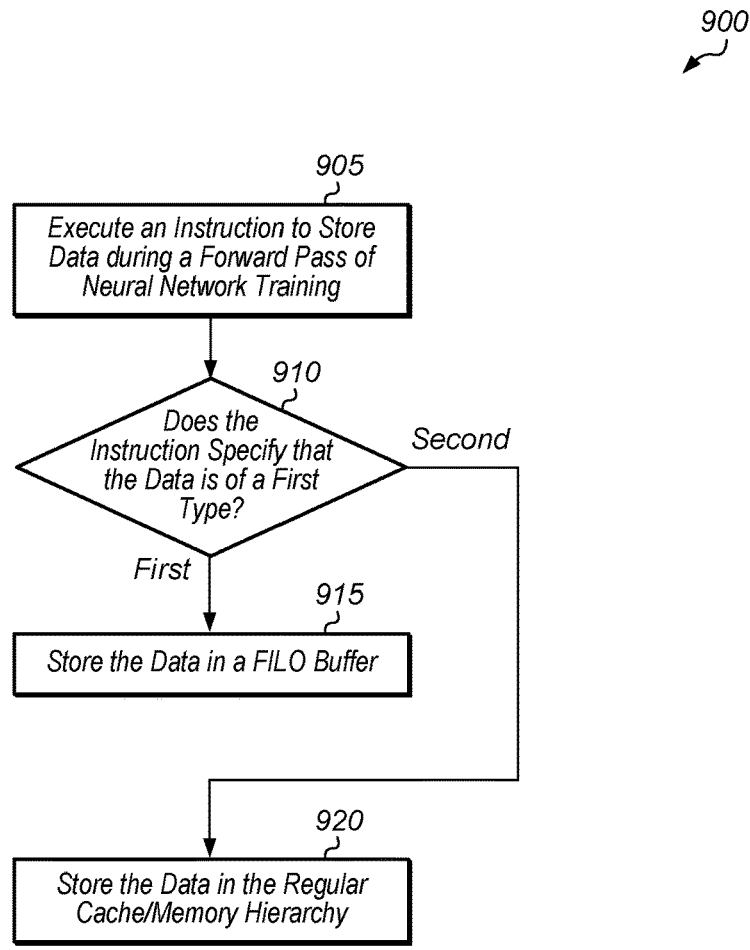
FIG. 9 is a generalized flow diagram illustrating one implementation of a method for executing an instruction for storing data during a forward pass of neural network training.
Figure 10:
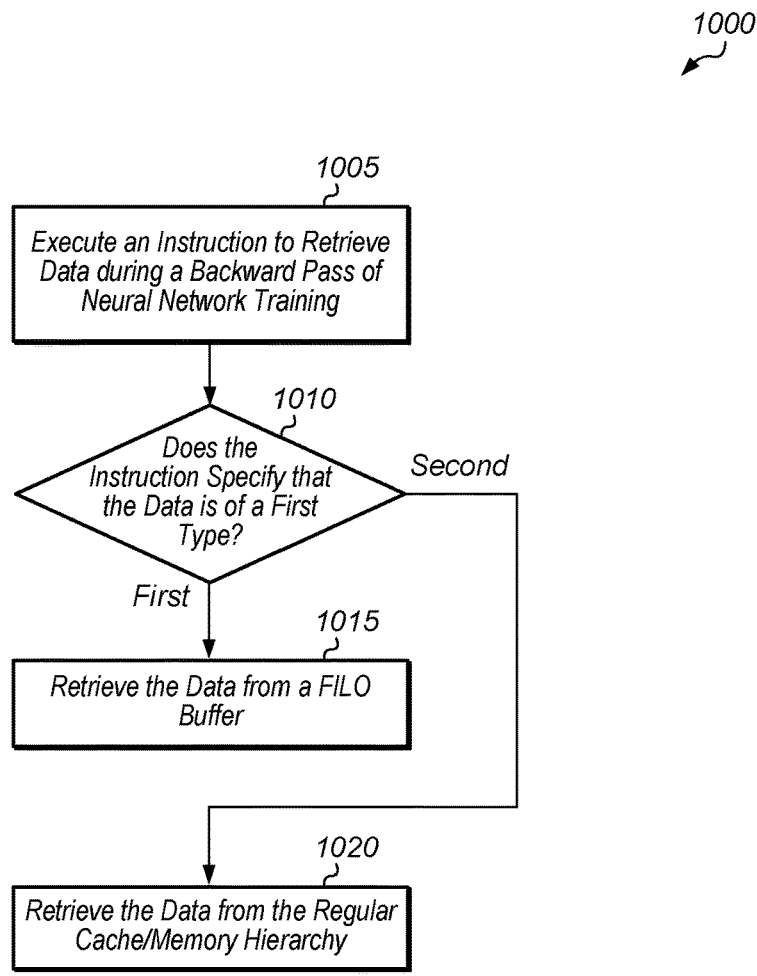
FIG. 10 is a generalized flow diagram illustrating one implementation of a method for executing an instruction for retrieving data during a backward pass of neural network training.

Referring now to FIG. 7, one implementation of a method 700 for optimizing neural network training with a first-in, last-out (FILO) buffer is shown. For purposes of discussion, the steps in this implementation those of FIG. 8-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

Training of a neural network training is initiated on a computing system (block 705). As part of the neural network training, a forward pass through the neural network is initiated (block 710). During the forward pass, each layer, from first to last, of the neural network generates and stores a corresponding set of data in a FILO buffer (block 715). If the last layer has been reached during forward propagation (conditional block 720, "yes" leg), then an error is calculated based on a difference between an actual result and an expected result (block 725). Next, a backward pass through the neural network is initiated (block 730). If the last layer has not yet been reached during forward propagation (conditional block 720, "no" leg), then method 700 returns to block 715.

During the backward pass, each layer, from last to first, of the neural network retrieves a corresponding set of data stored in the FILO buffer (block 735). Each layer makes adjustments to the corresponding retrieved set of data (e.g., weights, activation function parameters) based on the error (block 740). In one implementation, a gradient is calculated indicating an amount by which individual parameters of the set are to be adjusted to reduce the error amount. If the first layer has been reached during backward propagation (conditional block 745, "yes" leg), then the application determines if another training pass should be performed (conditional block 750). In one implementation, the application schedules another pass if the previously calculated error is greater than a threshold. If the first layer has not been reached during backward propagation (conditional block 745, "no" leg), then method 700 returns to 735. If another training pass will be performed (conditional block 750, "yes" leg), then method 700 returns to block 710. Otherwise, if all training passes have been completed (conditional block 750, "no" leg), then method 700 ends.

Turning now to FIG. 8, one implementation of a method 800 for using a reconfigurable memory subsystem is shown. A computing system (e.g., computing system 600 of FIG. 6) initiates execution of a given application (block 805). In one implementation, the computing system includes at least a reconfigurable memory subsystem, one or more processing units, and a control unit for programming the reconfigurable memory subsystem. If the given application is a neural network training application (conditional block 810, "yes" leg), then the control unit programs a first collection of storage elements of the memory subsystem to operate as a FILO buffer (block 815). Next, the FILO buffer is used for storing, in a first-in, last-out manner, data generated during a forward pass of neural network training (block 820). Also, the data is retrieved from the FILO buffer in a first-in, last-out manner during a backward pass of neural network training (block 825). After block 825, method 800 ends.

If the given application is not a neural network training application (conditional block 810, "no" leg), then a control unit programs the first collection of storage elements to be integrated within the memory subsystem to enable the first collection of storage elements to be used for normal cache or memory operations (block 830). After block 830, method 800 ends. By implementing method 800, a computing system with a reconfigurable memory subsystem is able to adapt to the specific type of application being executed. Accordingly, during neural network training, the first collection of storage elements are used in an efficient manner for calculating gradients and updating weights and other parameters during training of a neural network. When other types of applications are executed by the system, the first collection of storage elements are used in the traditional manner by these applications rather than being idle. For example, after a neural network is trained, the trained neural network is used as an inference engine in one implementation. In this implementation, the inference engine uses the first collection of storage elements in the conventional manner within the overall memory subsystem.

Referring now to FIG. 9, one implementation of a method 900 for executing an instruction for storing data during a forward pass of neural network training is shown. An instruction is executed to store data during a forward pass of neural network training (block 905). If the instruction specifies that the data is of a first type (conditional block 910, "first" leg), then the compute engine stores the data in a FILO buffer (block 915). In one implementation, the first type includes weights, activation function parameters, and/or other parameters that are used for processing and/or filtering the input data to the layer. Otherwise, if the instruction specifies that the data is of a second type (conditional block 910, "second" leg), then the compute engine stores the data in the regular cache/memory hierarchy (block 920). In one implementation, the second type of data includes the input data to the layer and/or the output data of the layer. After blocks 915 and 920, method 900 ends. It is noted that method 900 can be performed many times during each layer and during multiple different layers while implementing the forward pass of neural network training.

Turning now to FIG. 10, one implementation of a method 1000 for executing an instruction for retrieving data during a backward pass of neural network training is shown. An instruction is executed to retrieve data during a backward pass of neural network training (block 1005). If the instruction specifies that the data is of a first type (conditional block 1010, "first" leg), then the compute engine retrieves the data from a FILO buffer (block 1015). In one implementation, the first type of data includes weights, activation function parameters, and/or other parameters that are used for processing and/or filtering the input data to the layer. Otherwise, if the instruction specifies that the data is of a second type (conditional block 1010, "second" leg), then the compute engine retrieves the data from the regular cache/memory hierarchy (block 1020). In one implementation, the second type of data includes error data and/or other data. After blocks 1015 and 1020, method 1000 ends. It is noted that method 1000 can be performed many times during each layer and during multiple different layers while implementing the backward pass of neural network training.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:
1. A system comprising:
a first-in, last-out (FILO) buffer; and
a compute engine comprising a plurality of processing elements coupled to the FILO buffer, wherein the compute engine is configured to:
execute a plurality of layers of a neural network during a forward pass;
store a corresponding set of data in the FILO buffer during execution of each layer of the plurality of layers during the forward pass;
calculate an error for the neural network after completing the forward pass;
retrieve the corresponding set of data from the FILO buffer for each layer of the plurality of layers during a backward pass; and
perform adjustments to the corresponding set of data based on the error.

2. The system as recited in claim 1, wherein the compute engine is further configured to calculate gradients based on the error during the backward pass so as to calculate the adjustments to be performed to the corresponding set of data, and wherein the corresponding set of data comprises weights and activation function parameters for each layer.

3. The system as recited in claim 1, wherein the compute engine is further configured to:
execute a given instruction during the forward pass;
store given data in the FILO buffer responsive to the given instruction specifying that the given data is of a first type; and
store the given data in a cache subsystem responsive to the given instruction specifying that the given data is of a second type.

4. The system as recited in claim 1, wherein the compute engine is further configured to:
execute a given instruction during the backward pass;
retrieve given data from the FILO buffer responsive to the given instruction specifying that the given data is of a first type; and
retrieve the given data from a cache subsystem responsive to the given instruction specifying that the given data is of a second type.

5. The system as recited in claim 1, further comprising a reconfigurable memory subsystem, wherein the reconfigurable memory subsystem comprises the FILO buffer.

6. The system as recited in claim 5, further comprising a control unit, wherein the control unit is configured to program a size of the FILO buffer to store an entirety of the corresponding set of data for a single layer.

7. The system as recited in claim 6, wherein the control unit is further configured to reprogram the FILO buffer to be available for regular cache and/or memory operations responsive to determining training of the neural network has completed.

8. A method comprising:
executing, by a compute engine, a plurality of layers of a neural network during a forward pass;
storing a corresponding set of data in a first-in, last-out (FILO) buffer during execution of each layer of the plurality of layers during the forward pass;
calculating an error for the neural network after completing the forward pass;
retrieving the corresponding set of data from the FILO buffer for each layer of the plurality of layers during a backward pass; and
performing adjustments to the corresponding set of data based on the error.

9. The method as recited in claim 8, further comprising calculating gradients based on the error during the backward pass so as to calculate the adjustments to be performed to the corresponding set of data, wherein the corresponding set of data comprises weights and activation function parameters for each layer.

10. The method as recited in claim 8, further comprising:
executing a given instruction during the forward pass;
storing given data in the FILO buffer responsive to the given instruction specifying that the given data is of a first type; and
storing the given data in a cache subsystem responsive to the given instruction specifying that the given data is of a second type.

11. The method as recited in claim 8, further comprising:
executing a given instruction during the backward pass;
retrieving given data from the FILO buffer responsive to the given instruction specifying that the given data is of a first type; and
retrieving the given data from a cache subsystem responsive to the given instruction specifying that the given data is of a second type.

12. The method as recited in claim 8, wherein the FILO buffer is part of a reconfigurable memory subsystem.

13. The method as recited in claim 8, further comprising programming, by a control unit, a size of the FILO buffer to store an entirety of the corresponding set of data for a single layer.

14. The method as recited in claim 13, further comprising reprogramming the FILO buffer to be available for regular cache and/or memory operations responsive to determining training of the neural network has completed.

15. An apparatus comprising:
a reconfigurable memory subsystem comprising a plurality of storage elements; and
a compute engine comprising a plurality of processing elements coupled to the reconfigurable memory subsystem, wherein the compute engine is configured to:
execute a plurality of layers of a neural network during a forward pass;
store a corresponding set of data in a first plurality of processing elements programmed as a first-in, last-out (FILO) buffer during execution of each layer of the plurality of layers during the forward pass;
calculate an error for the neural network after completing the forward pass;
retrieve the corresponding set of data from the FILO buffer for each layer of the plurality of layers during a backward pass; and
perform adjustments to the corresponding set of data based on the error.

16. The apparatus as recited in claim 15, wherein the compute engine is further configured to calculate gradients based on the error during the backward pass so as to calculate the adjustments to be performed to the corresponding set of data, and wherein the corresponding set of data comprises weights and activation function parameters for each layer.

17. The apparatus as recited in claim 15, wherein the compute engine is further configured to:
execute a given instruction during the forward pass;
store given data in the FILO buffer responsive to the given instruction specifying that the given data is of a first type; and
store the given data in a cache subsystem responsive to the given instruction specifying that the given data is of a second type.

18. The apparatus as recited in claim 15, wherein the compute engine is further configured to:
execute a given instruction during the backward pass;
retrieve given data from the FILO buffer responsive to the given instruction specifying that the given data is of a first type; and
retrieve the given data from a cache subsystem responsive to the given instruction specifying that the given data is of a second type.

19. The apparatus as recited in claim 15, further comprising a control unit, wherein the control unit is configured to program a size of the FILO buffer to store an entirety of the corresponding set of data for a single layer.

20. The apparatus as recited in claim 19, wherein the control unit is further configured to reprogram the FILO buffer to be available for regular cache and/or memory operations responsive to determining training of the neural network has completed.

* * * * *